Feb. 17, 1970 E. M. SHUGARMAN 3,495,607
FIRST STAGE REGULATOR AND RESERVE VALVE IN COMMON HOUSING
Filed Sept. 14, 1964 2 Sheets-Sheet 2
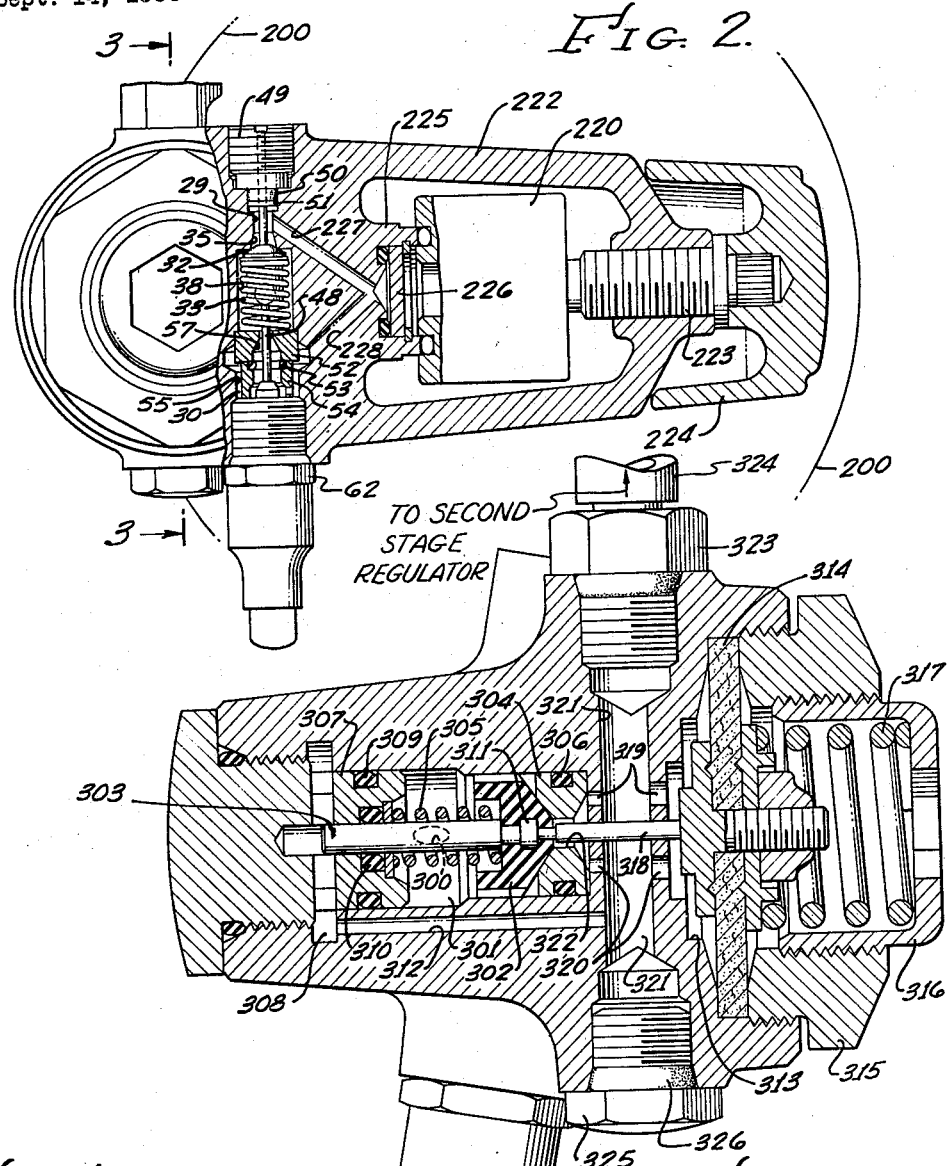
Fig. 2.
TO SECOND STAGE REGULATOR
Fig. 3.
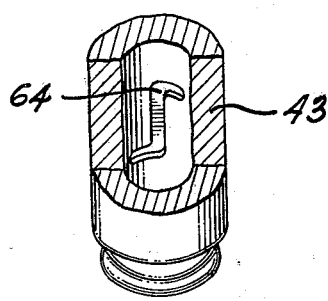
Fig. 1A.
INVENTOR.
EARL M. SHUGARMAN
BY Nicholas T. Vohn
ATTORNEY.

3,495,607
Patented Feb. 17, 1970

3,495,607
FIRST STAGE REGULATOR AND RESERVE VALVE IN COMMON HOUSING
Earl M. Shugarman, Costa Mesa, Calif., assignor to W. J. Voit Rubber Corp., a corporation of California
Filed Sept. 14, 1964, Ser. No. 396,126
Int. Cl. B63c *11/22;* F16k *17/36, 37/00*
U.S. Cl. 137—81                    5 Claims

ABSTRACT OF THE DISCLOSURE

This invention relates to the combination comprising a first stage pressure regulator and a reserve valve mounted in a common housing, both valves being compensated for variable ambient water pressure and the reserve valve having remote control means for operating said valve in a predetermined manner.

---

This invention relates to pressure regulators and more particularly to regulators used with self-contained underwater breathing apparatus known as scuba.

The regulators of the above type are known as first and second stage regulators. The first stage regulator reduces the air pressure from 2400–2500 p.s.i. to 120–125 p.s.i. and the second stage regulator reduces this pressure to an ambient pressure of water surrounding the diver so that the diver is constantly pressurized to the ambient water pressure which is a function of the depth of dive. The scuba systems of the above type also have the so-called reserve valves which shut off supply of air from an air cylinder when the air pressure drops down to a pressure determined by two factors. The first factor is the constant pressure exerted on a reserve valve by a coil spring which closes the valve. The second pressure is the ambient pressure of water which varies as the depth of dive varies. The resultant total pressure is equal to the sum of the two pressures, and this total variable pressure is, therefore, a function of ambient water pressure. The reserve valve, therefore, is an ambient pressure compensated valve which automatically closes at higher air pressure the deeper the dive. Such operation of the reserve valve retains a proportionately larger amount of air in the cylinder for deeper dives and a smaller amount of air for shallower dives, which is necessary since much more air is required during a long ascent as compared to that required by a shorter ascent.

The invention discloses a combination of the ambient pressure compensated reserve valve with the ambient pressure compensated first stage regulator, with the reserve valve and the first stage regulator having a common, single housing.

It is, therefore, an object of this invention to provide a first stage pressure regulator and a reserve valve mounted in a common housing, both valves being compensated for variable ambient water pressure and the reserve valve having remote control flexible cable for operating the reserve valve and for locking the reserve valve operating mechanism first in closed position and then in an open position.

Other objects and advantages of this invention will appear from the following description of two embodiments of the invention and from the appended claims.

Referring to the drawings:

FIGURE 1A is a sectional view of the push-pull rod locking arrangement for the rod used for operating the reserve valve, this locking arrangement being also illustrated in FIGURE 1;

FIGURE 2 is a plan view, partly in section, of a diaphragm type first stage regulator and reserve valve mounted in a common housing;

FIGURE 3 is a cross-sectional view of the regulator illustrated in FIGURE 2 with the section taken in a plane 3—3 illustrated in FIGURE 2.

Figure 1:
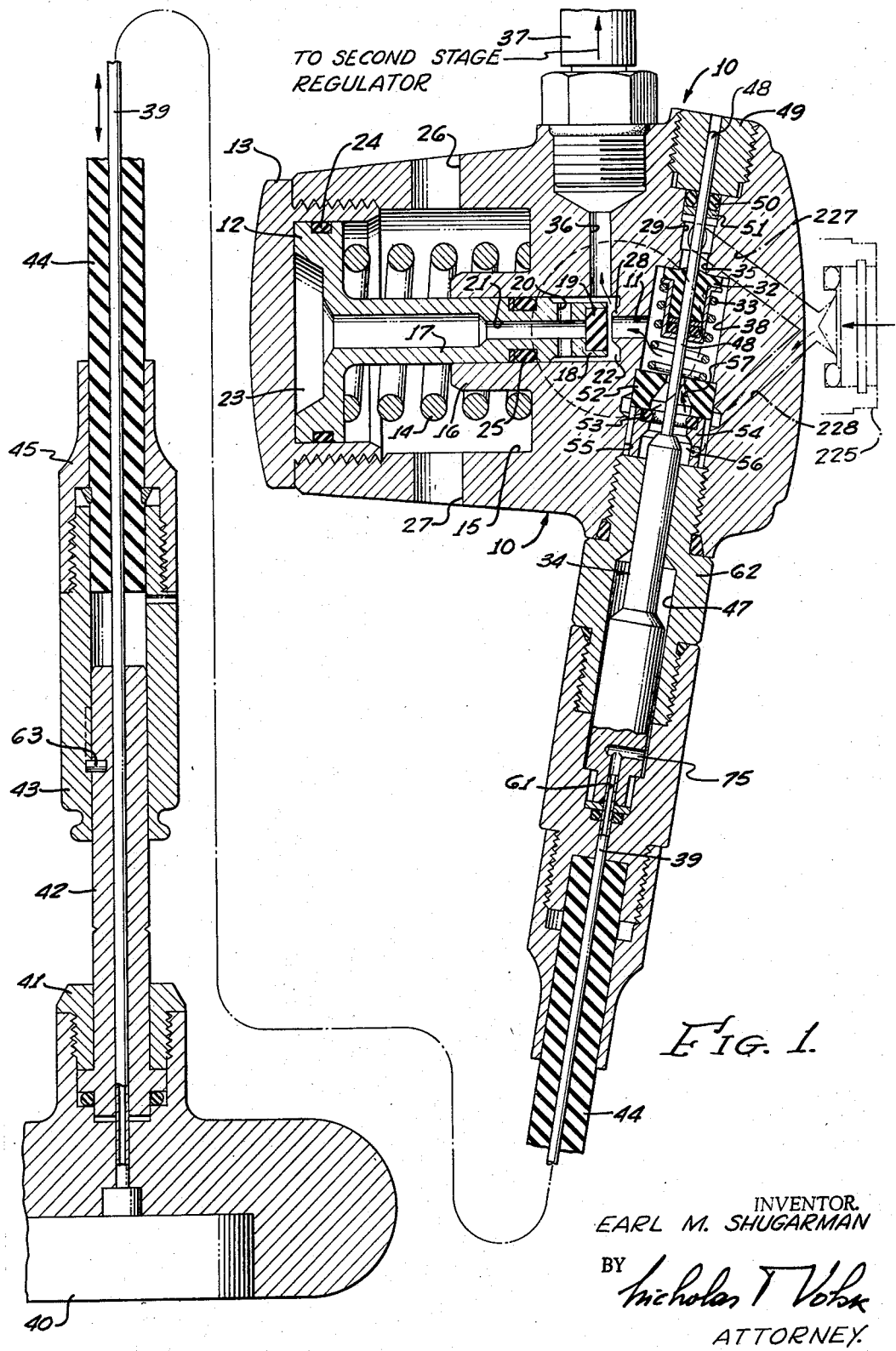
FIGURE 1 is a sectional side view of the reserve valve and piston type first stage regulator mounted in a common housing.

Referring to FIGURE 1, a piston type regulator and a reserve valve are both mounted in a common housing 10 and are interconnected with a duct 11. The regulator includes a piston 12 normally held against a piston retainer 13 by a coil spring 14 mounted in a central chamber 15 of the housing. Chamber 15 is provided with a boss 16 which is used for guiding a valve stem 17 connected to piston 12. Stem 17 is provided with a valve head 18 and a valve washer 19 made of a suitable elastomeric material. Stem 17 is provided with ducts 20 and 21 which connect a chamber 22 with a chamber 23 formed by a recess in piston 12 and retainer 13. Piston 12 and stem 17 are provided with circular recesses for incorporating O-rings 24 and 25. Chamber 15 is connected to an ambient medium (air or water) through ports 26 and 27. The ambient medium is atmospheric air when the regulator is in the air and it is water when the regulator is in water during a dive. Therefore, the regulator is compensated for ambient water pressure during a dive, water exerting the compensating pressure on piston 12 and this water pressure attempts and sometimes does open the regulator valve as the water pressure increases with the increase in the depth of the dive. This ambient water pressure presses on piston 12 in the same direction as spring 14. Washer 19, when the regulator valve is closed, rests on a regulator valve seat 28 and keeps the valve closed. Seat 28 surrounds the downstream end of duct 11 which supplies air at high pressure to the regulator from an air cylinder 200, FIG. 2, which is connected to the regulator through a shut-off valve 220 and yoke 222 is provided with a threaded stud 223, a knob 224, and a seat 225 provided with a sintered metal filter 226. The seat and the filter are connected to two ducts 227 and 228 which are also illustrated in dotted lines in FIGURE 1. Duct 227 is connected to a chamber 29 and duct 228 is connected to a chamber 30 in the reserve valve assembly. The reserve valve assembly is provided with four chambers: 29, 38, 55 and 47. All of these chambers are air-filled chambers.

The reserve valve assembly has two valves: one valve 32 will be called here as the reserve valve, and the second valve 34 will be called here as the by-pass valve. The reserve valve 32 shuts off supply of air from cylinder 200 when the pressure exerted on valve 32 by a spring 33 is high enough to overcome the counter pressure exerted on valve 32 by compressed air in chamber 29. Valve 32 is slidingly mounted on a rod 34 and valve 32 slides into the closed position, illustrated in FIGURE 1, against a circular seat 35 when the air pressure in cylinder 200 drops to the pressure determined by spring 33 and the ambient water pressure which acts on piston 12 and in this manner increases the air pressure in the outgoing duct 36 connected to a high pressure hose 37 leading to the second stage regulator which is also compensated for a change in ambient pressure. This higher pressure in duct 36 is transmitted to chamber 38 through duct 11 and this higher air pressure in chamber 38 closes valve 32 against a higher pressure in duct 227 and cylinder 200. In this manner the reserve valve closes at a higher cylinder pressure the deeper is the dive. In this manner the reserve valve provides more reserve air in the cylinder for deeper dives and less reserve air for shallower dives.

When valve 32 closes, it cuts off the supply of air to the diver which gives him notice that the reserve valve has closed and that only enough air remains in the cylinder for ascent and that the ascent should begin at once. In order to restore the supply of air, the diver pulls on a pressure gauge 40 which is connected to the by-pass valve 34 through a bushing 42 and a tube 39, the outer end of tube 39 being brazed to bushing 42. Bushing 42 forms a sliding engagement with a sleeve 43. Sleeve 43 is connected to a "nylon" tube 44 by means of a long nut 45. Tube 39 makes a sliding fit within nylon tube 44. Bushing 42 is fastened to the pressure gauge 40 by a nut 41. Tube 39 at the inner end 61 is connected to the by-pass valve 34. Valve 34 is provided with a rod 48 projecting into ambient medium through a plug 49. Rod 48 is used for balancing ambient pressure on both sides of the reserve valve assembly and especially tube 39. In this manner, the operating mechanism of the reserve valve is independent of ambient pressure, while the reserve valve 32 itself, as pointed out previously, is subjected to an air pressure which is a function of the ambient pressure so that larger amount of air is stored or retained in the air cylinder 200 for deeper dives. Rod 48 is sealed with an O-ring 50 which is compressed against a washer 51 resting against a notch in chamber 29. The by-pass valve 34 is provided with a seat 52 and an O-ring 53 which is nested in a ring retainer 54. Ring retainer has a smaller diameter than a cylindrical bore 55 in housing 10. Bore 55 is connected directly to the air cylinder through duct 228. Retainer 54 is provided with an orifice 56 which interconnects bore 55 with a chamber 57 formed by and within retainer 54 and seat 52. When valve 34 is open, which is the position illustrated in FIGURE 1, air flows from cylinder 200 through duct 228, chamber 55, orifice 56, chamber 57, a central orifice in seat 52, chamber 38, duct 11, open valve 12–17–19, duct 36 and hose 37, on its way to the second stage and the diver.

The by-pass valve 34 is connected to the inner end 61 of tube 39. The inner end 61 is an open end and terminates and opens into a cross-bore 75 in the valve member 34. Tube 39 receives air under pressure from the air cylinder 200 through duct 228, chamber 55, orifice 56, chamber 57, air-leaking sliding fit between valve 34 and a connector 62, chamber 47, the cross-bore 75 and tube 39. Tube 39 then transmits this pressure to pressure gauge 40. Bushing 42 is provided with a pin 63 and sleeve 43 is provided with a Z-shaped groove 64, FIGURE 1A, which produce a bayonet type of lock between sleeve 43 and bushing 42. This lock is provided to hold valve 34 in a positive manner either in a closed or an open position.

FIGURES 2 and 3 illustrate the first stage regulator of the diaphragm type with the reserve valve of the type illustrated in FIGURE 1 mounted in the same housing with the regulator.

The connections between the regulator and the cylinder were described already in connection with FIGURE 2 and, therefore, need no additional description. The reserve valve illustrated in FIGURE 2 is identical to that illustrated in FIGURE 1 and, therefore, needs no additional description. The only description that need be given is that of the regulator and connections between the regulator and the air cylinder.

Referring to FIGURE 2, air from cylinder 200 passes through the shut-off valve 220, filter 226, duct 227 and duct 228, reserve valve chambers 29 and 30 and a duct 300 which corresponds to duct 11 in FIGURE 1. Duct 300 conveys air under high pressure from cylinder 200 to the central chamber 301 of the regulator. If the regulator valve is closed, there is no flow of air beyond chamber 301. The regulator valve includes a poppet 302 mounted on a poppet rod 303. Poppet 302 is normally held against a poppet seat 304 by a spring 305. Poppet 302 is provided with an O-ring 306 to seal it to the chamber wall of chamber 301. A spring retainer 307 is mounted in chamber 301 to guide rod 303 and to seal off a low pressure chamber 308 from the high pressure chamber 301. Two O-rings 309 and 310 are used for this purpose. The outer end of rod 303 projects into the low pressure chamber 308 and the inner end 311 is permanently imbedded in poppet 302 which is made of "nylon" or some other suitable resin. A duct 312 connects the low pressure chamber 308 with a diaphragm chamber 313. Chamber 313 is provided with a diaphragm 314, a diaphragm retainer 315, a pressure regulating nut 316, a spring 317 and a poppet actuator 318 connected on one side to diaphragm 314 and abutting against poppet 302 on the other side. Four ducts interconnect chamber 301 with chamber 313, only two ducts 319 and 320 being visible in FIGURE 3. The other two ducts are identical to the ducts 319 and 320 except that they lie in a plane at right angles to the plane illustrated in FIGURE 3. A central main duct 321 is connected to chamber 301 through the regulator valve 302–304 and a central opening 322 in the poppet seat 304. It is also connected to chamber 313 through the four ducts, two of which, 319 and 320, being visible in FIGURE 3. Duct 321 is connected through a coupling nipple 323 to an outgoing flexible high pressure hose 324 which is connected to the second stage regulator, not shown. The opposite end of duct 321 is closed off by a plug 325 and an O-ring 326.

The operation of the diaphram type regulator is as follows: High pressurea ir enters duct 300 and chamber 301. Normally poppet valve 302 is open and air enters duct 321 and chamber 313. Air pressure presses on diaphragm 314 and bends it outwardly which closes the poppet valve 302. If air is withdrawn from duct 321, the pressure in duct 321 drops and diaphragm 314 now reopens valve 302. Duct 312 conveys the low, regulated pressure from duct 321 to chamber 308 for equalizing the pressure on rod 303 with that on rod 318 and the open portion of valve 302.

What is claimed as new is:

1. A combination of a pressure regulator and a reserve valve for self-contained underwater breathing apparatus comprising a housing, an inlet port on one side of said housing for receiving compressed air from an air cylinder, first and second input ducts within said housing connected to said inlet port, a reserve valve and a by-pass valve mounted within said housing, a pressure regulator mounted within said housing and having a regulator valve, first duct means connecting said first input duct to said regulator valve, said reserve valve being connected in series with said first input duct and said duct means, said reserve valve having means responsive to inlet pressure to close said first duct means when air pressure in said inlet port reaches a predetermined low value, second duct means interconnecting said second input duct with said regulator valve, said by-pass valve being connected in series with said second input duct and said second duct means, a manually operated remote control means for closing and opening said by-pass valve and said second duct means, and means locking said control means in a predetermined position.

2. The combination as defined in claim 1 in which said pressure regulator includes a first central chamber, ports connecting said central chamber to ambient medium surrounding said housing, a piston and a biasing spring mounted within said chamber, said spring engaging said piston and tending to open said regulator valve, a second chamber on the outer side of said piston, said piston sealing off said second chamber from said first chamber, a push rod connected to said piston and said regulator valve for opening and closing said regulator valve, a third chamber in said housing accommodating said regulator valve and a portion of said push rod, means for sealing off said third chamber from said first chamber, an input duct to said third chamber, an outgoing discharge duct connected to said third chamber, and third duct means within said push rod and said piston connecting said third chamber to said second chamber.

3. The combination as defined in claim 1 in which said pressure regulator comprises a diaphragm mounted within said housing, a first spring pressing on the outer surface of said diaphragm; external, manually operated means for adjusting the pressure of said spring on said diaphragm, a push rod connected to and operated by said diaphragm for openings and closing said regulator valve, a first central chamber in said housing accommodating said regulator valve, a second spring mounted in said first chamber and engaging said regulator valve, said second spring opposing said first spring by tending to keep said regulator valve closed, said first and second duct means having a common duct interconnecting said first central chamber with said first and second duct means, a second chamber in said housing connected for fluid flow to said first chamber through said regulator valve and to the inner surface of said diaphragm, and an outgoing duct connected to said second chamber.

4. The combination as defined in claim 3 which also includes a guide rod mounted in said first chamber having its inner end connected to said regulator valve and its outer end projecting into the outer end of said first central chamber, a sealing and guide member surrounding said guide rod and acting as a guide means for said rod and sealing off the outer end of said first chamber from the central portion of said first chamber, and duct means interconnecting said second chamber with the outer portion of said first chamber.

5. A combination of a first stage regulator and a reserve valve comprising a common housing, an inlet port at one side of said housing, a yoke for connecting said housing by means of said inlet port to a source of compressed air, first and second fluid-dynamically parallel ducts connected to said inlet port, a first chamber connected to said first duct, a second chamber connected to said second duct, a third chamber between said first and second chambers, a reserve valve responsive to pressure differential across said valve for controlling a fluid passageway interconnecting said second and third chambers, a spring mounted in said third chamber closing said reserve valve when pressure of said source drops to a predetermined value, thereby shutting off said third chamber from said second chamber, a by-pass valve controlling a fluid passageway interconnecting said first and third chambers, a pressure regulator valve mounted in said housing, a third duct connecting said third chamber with said pressure regulator valve, an outgoing duct on the downstream side of said regulator valve, and a manually operated means for closing and opening said by-pass valve.

References Cited
UNITED STATES PATENTS 2,758,596  8/1956  Cupp _____ 128—142.2

WILLIAM F. O'DEA, Primary Examiner

R. GERARD, Assistant Examiner

U.S. Cl. X.R.

137—505.18, 505.28, 557, 599